United States Patent
Profeta, Jr. et al.

(10) Patent No.: US 9,631,961 B2
(45) Date of Patent: Apr. 25, 2017

(54) INDUCTIVE FLOW METER INCLUDING EXTENDED MAGNETIC POLE PIECES

(71) Applicant: Sensus Spectrum LLC, Raleigh, NC (US)

(72) Inventors: Joseph Anthony Profeta, Jr., Cary, NC (US); Trampas Stern, Raleigh, NC (US)

(73) Assignee: Sensus Spectrum LLC, Raleigh, NC (US)

( * ) Notice: Subject to any disclaimer, the term of this patent is extended or adjusted under 35 U.S.C. 154(b) by 0 days.

(21) Appl. No.: 14/829,749

(22) Filed: Aug. 19, 2015

(65) Prior Publication Data

US 2017/0052047 A1    Feb. 23, 2017

(51) Int. Cl.
*G01F 1/58* (2006.01)
(52) U.S. Cl.
CPC .................................... *G01F 1/584* (2013.01)
(58) Field of Classification Search
CPC .................................... G01F 1/58; G01F 1/60
USPC .............. 73/861.13, 861.12, 861.15, 861.17
See application file for complete search history.

(56) References Cited

U.S. PATENT DOCUMENTS

| | | | |
|---|---|---|---|
| 4,175,566 A | 11/1979 | Millar | |
| 4,727,755 A * | 3/1988 | Schmoock | G01F 1/60 73/861.12 |
| 5,583,299 A * | 12/1996 | Murase | A61B 5/0265 73/861.12 |
| 5,691,484 A * | 11/1997 | Feller | G01F 1/584 73/861.13 |
| 6,260,420 B1 | 7/2001 | Ketelsen et al. | |
| 6,626,048 B1 | 9/2003 | Dames et al. | |
| 7,735,379 B2 | 6/2010 | Glauser | |
| 7,992,451 B2 | 8/2011 | Ehrenberg et al. | |
| 8,006,569 B2 | 8/2011 | Goegge et al. | |
| 8,286,503 B2 | 10/2012 | Neuberger et al. | |
| 8,312,767 B2 | 11/2012 | Maute | |
| 8,408,070 B2 | 4/2013 | Matzen | |
| 8,448,524 B2 | 5/2013 | Goegge et al. | |
| 8,826,743 B2 | 9/2014 | Goegge et al. | |

(Continued)

FOREIGN PATENT DOCUMENTS

GB          1246450 A          9/1971

OTHER PUBLICATIONS

International Search Report and Written Opinion for International Application No. PCT/US2016/042250 mailed Nov. 11, 2016.

*Primary Examiner* — Jewel V Thompson
(74) *Attorney, Agent, or Firm* — Andrus Intellectual Property Law, LLP

(57) ABSTRACT

A magnetic flow meter includes a magnetic flow transducer positioned to sense the flow of water through the flow meter. The magnetic flow transducer includes first and second electrodes positioned on opposite sides of a measuring channel. First and second magnetic pole pieces are positioned on opposite sides of the measuring channel and orthogonal to the first and second electrodes. The magnetic pole piece includes extending tab portions that are located adjacent to the first and second electrodes on opposite sides of the first and second electrodes. The extended tabs formed on each of the first and second magnetic pole pieces reduce the induced voltage within the electrodes to increase the accuracy of the measurement taken by the magnetic flow transducer.

20 Claims, 7 Drawing Sheets

(56) References Cited

U.S. PATENT DOCUMENTS

| | | | |
|---|---|---|---|
| 2001/0002553 A1 | 6/2001 | Van Willigen | |
| 2002/0190444 A1* | 12/2002 | Kagan | B22D 11/064 266/237 |
| 2014/0020477 A1* | 1/2014 | van Willingen | G01F 1/588 73/861.12 |

* cited by examiner

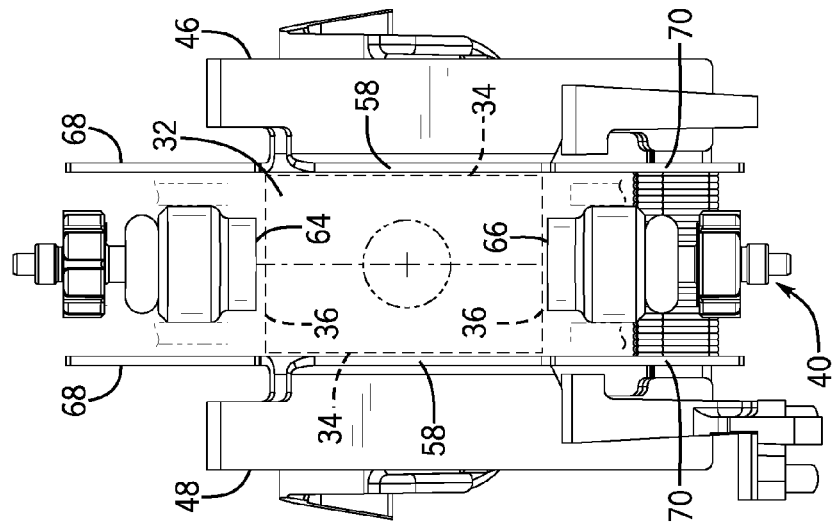
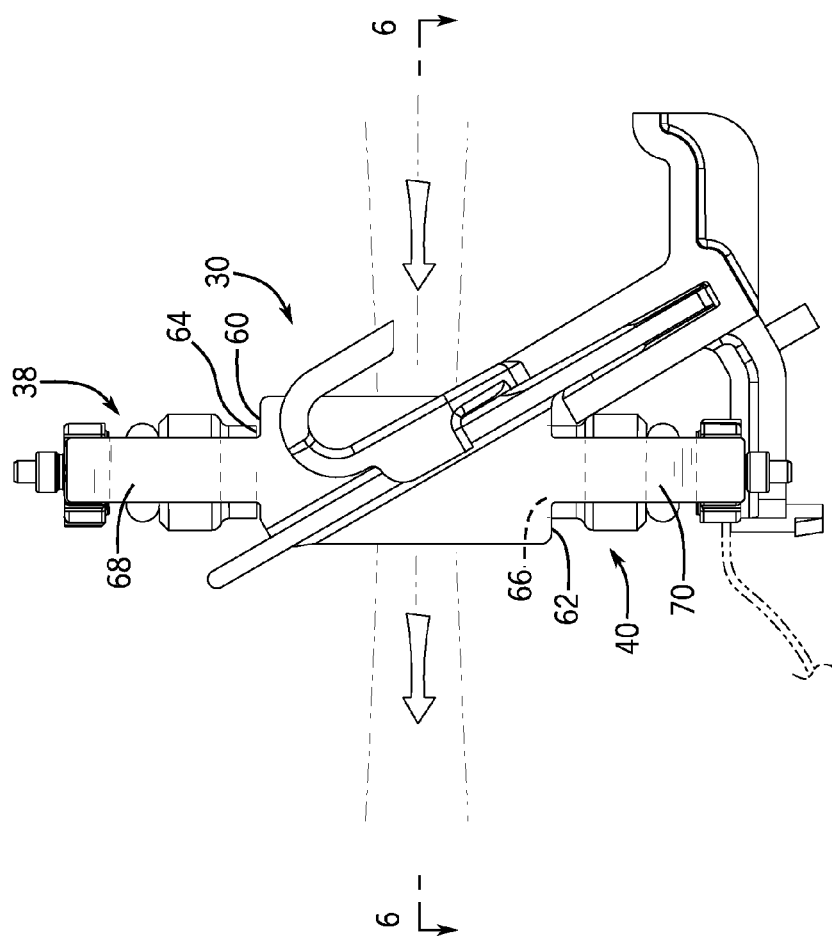
FIG. 5
FIG. 4

INDUCTIVE FLOW METER INCLUDING EXTENDED MAGNETIC POLE PIECES

BACKGROUND

The present disclosure generally relates to a magnetic inductive flow meter for measuring the flow rate of water. More specifically, the present disclosure relates to a magnetic flow transducer that includes extended magnetic pole pieces to improve the accuracy of the magnetic inductive flow meter.

Magnetic inductive flow meters use a measuring method that is based on Faraday's law of electromagnetic induction. The first basis for the magnetic inductive measurement of the flow velocity of fluids was reported in 1832 in a publication by Michael Faraday. Modern electronic switching technology in conjunction with alternating magnetic fields made it possible to overcome the separation of the useful signals, proportional to the flow velocity, from interference signals, which occur in electrochemical processes during the generation of the magnetic field at the electrodes used for signal decoupling. Thus, nothing seemed to stand in the way of the wide industrial use of magnetic inductive flow meters.

The measuring principle of magnetic inductive flow meters utilizes the separation of moving charges in a magnetic field. The conductive fluid to be measured flows through a tube which is made of nonmagnetic material and whose interior is electrically insulated. A magnetic field is applied from the outside by means of coils. The charge carriers present in the conductive fluid, such as ions and other charged particles, are deflected by the magnetic field: the positive charge carriers to one side and the negative charge carriers to another side. A voltage, which is detected with a measuring device, arises due to the charge separation at measuring electrodes arranged perpendicular to the magnetic field. The value of the measured voltage is proportional to the flow velocity of the charge carriers and thereby proportional to the flow velocity of the measuring fluid. The flow volume can be determined over time by integration.

In magnetic fields generated by pure alternating voltage, induction of interference voltages occurs in the electrodes, which must be suppressed by suitable but costly filters. For this reason, the magnetic field is usually generated by a clocked direct current of alternating polarity. This assures a stable zero point and makes the measurement insensitive to effects by multiphase substances and inhomogeneities in the fluid. In this way, a usable measuring signal can also be achieved at a low conductivity.

If a measuring fluid moves through the measuring tube, according to the induction law a voltage is present at both measuring electrodes, which are arranged in the measuring tube perpendicular to the flow direction and perpendicular to the magnetic field. This voltage in the case of a symmetric flow profile and a homogeneous magnetic field is directly proportional to the average flow velocity. The inductive flow measuring method is capable of generating an electrically usable signal for further processing directly from the flow. The following equation basically applies: $U=k*B*D*v$, where U=voltage, k=proportionality factor, B=magnetic field strength, D=tube diameter, and v=flow velocity.

In one respect, this is a matter of the material. The measuring tube must be not be magnetic in order not to interfere with the magnetic field. The measuring tube further must be electrically insulating in order not to interfere with the picking up of the voltage with use of the electrodes. Moreover, the tube must have a food-safe material, when the liquid is a food, for example, drinking water.

These requirements can be fulfilled best when a food-safe plastic is used as the material. Nevertheless, plastics have the disadvantage of a much lower strength compared with metal. Resistance to internal pressure, however, is an essential requirement. The attempt to achieve internal pressure resistance with an increased thickness of the tube wall is not practicable, because otherwise the magnetic field would be weakened too greatly.

As mentioned above, the voltage at the measuring electrode is proportional to the magnetic field strength, provided that the magnetic field permeates the measuring channel homogeneously. U.S. Pat. No. 6,626,048 B1 disclosed a solution for a circular cylindrical measuring channel. This solution consisted of a magnetic coil with a magnetic core made of ferromagnetic electrical sheet steel and two magnetic poles coupled to the magnetic core and made of soft magnetic electrical sheet steel. Practical tests have shown, however, that satisfactory measurement results cannot be achieved with this arrangement. The reasons for this are the relatively long field lines and the high magnetic resistance in the electrical sheet steel, because the magnetic circuit is arranged around the electrodes.

U.S. Pat. No. 8,006,569, commonly assigned with the present disclosure, discloses a magnetic flow meter that includes a rectangular flow channel having a pair of sensing electrodes positioned adjacent to a pair of end walls and a pair of magnetic pole pieces positioned adjacent to opposite sidewalls. The magnetic flow transducer, which includes the pair of electrodes and the pair of pole pieces, generates an alternating magnetic field across the flow of liquid through the flow channel and senses the voltage difference between the pair of electrodes.

U.S. Pat. No. 8,826,743, also commonly assigned with the present disclosure, discloses a magnetic inductive flow meter that includes a pair of magnetic pole pieces formed from electrical sheet steel that is bent to form a double web and a rectangular magnetic pole. The pair of magnetic pole pieces is used to generate the alternating magnetic field, which created a voltage difference across the electrodes and is used to determine the flow rate of water through the meter.

SUMMARY

The present disclosure relates to a magnetic inductive flow meter. More specifically, the present disclosure relates to a magnetic flow transducer used within the magnetic inductive flow meter to increase the accuracy of the flow measurements.

The magnetic inductive flow meter includes a flow tube that has an inlet, an outlet and a measuring channel that is positioned between the inlet and the outlet. In one embodiment of the disclosure, the measuring channel has a rectangular cross-section defined by a pair of spaced sidewalls and a pair of spaced end walls. A flow of water passes through the measuring channel from the inlet to the outlet and the flow rate is measured within the measuring channel.

The magnetic flow transducer used within the magnetic inductive flow meter includes a first electrode and a second electrode that are positioned adjacent to opposite end walls of the measuring channel. In one embodiment of the disclosure, the first and second electrodes are formed from diamagnetic materials, which include a silver sensing pin and a graphite plug. A first magnetic pole piece and a second magnetic pole piece are positioned adjacent to opposite sidewalls of the measuring flow channel and are located orthogonal to the first and second electrodes. Each of the first and second magnetic pole pieces are coupled to an electromagnet, which in turn is activated by a control circuit to create an alternating magnetic field through the measuring channel. The alternating magnetic field created through the measuring channel induces a changing voltage in the first and second electrodes based on the flow of water through the meter. The voltage in the first and second electrodes is measured and used to determine the flow rate of water through the measuring channel.

In accordance with the present disclosure, each of the first and second magnetic pole pieces includes a generally rectangular surface element that is used to generate the magnetic field across the measuring channel. In one embodiment of the disclosure, each of the magnetic pole pieces is formed from a sheet of steel and includes an extended first tab portion and an extended second tab portion. The first tab portion extends from a first end of the rectangular surface element while the second tab portion extends from a second end of the rectangular surface element.

When the magnetic flow transducer is located within the magnetic inductive flow meter, the first tab portions of the first and second magnetic pole pieces are located on opposite sides of the first electrode and are positioned to overlap the diamagnetic materials of the first electrode. Likewise, the second tab portions on the first and second magnetic pole pieces are positioned on opposite sides of the second electrode to overlap the diamagnetic materials of the second electrode. The location of the first and second tab portions relative to the first and second electrode increases the size of the magnetic pole pieces and reduces the voltage induced in the electrodes by the fringe effect of the magnetic field. The increased size of the magnetic pole pieces increases the accuracy of the measurements taken by the magnetic flow transducer, especially at increased magnetic field strengths.

The first and second tab portions formed on each of the first and second magnetic pole pieces are integrally formed with the rectangular surface element such that each of the first and second magnetic pole pieces are formed from a single sheet of steel.

Various other features, objects and advantages of the invention will be made apparent from the following description taken together with the drawings.

BRIEF DESCRIPTION OF THE DRAWINGS

The drawings illustrate the best mode presently contemplated of carrying out the disclosure. In the drawings:

FIG. 4 is an side view of the magnetic flow transducer;

FIG. 5 is a front view of the magnetic flow transducer;

DETAILED DESCRIPTION

The magnetic induction flow meter, shown in U.S. Pat. Nos. 8,006,569 and 8,826,743, and sold by Sensus Metering Systems under the name iPERL functions to determine the flow rate of a liquid through the flow tube of a magnetic inductive flow meter. During testing, it was determined that the accuracy of such a meter decreased at low flow rates of liquid through the measuring channel. In order to improve this accuracy, the strength of the magnetic field generated across the measuring channel was increased. The increase in the magnetic field decreased the amount of flow noise, which should have increased the accuracy of the meter readings. However, the repeatability of the meters did not improve simply with an increase in the magnetic field strength. In order to increase the accuracy and repeatability of the readings from the meter, the subject matter of the present disclosure was developed.

Figure 1:
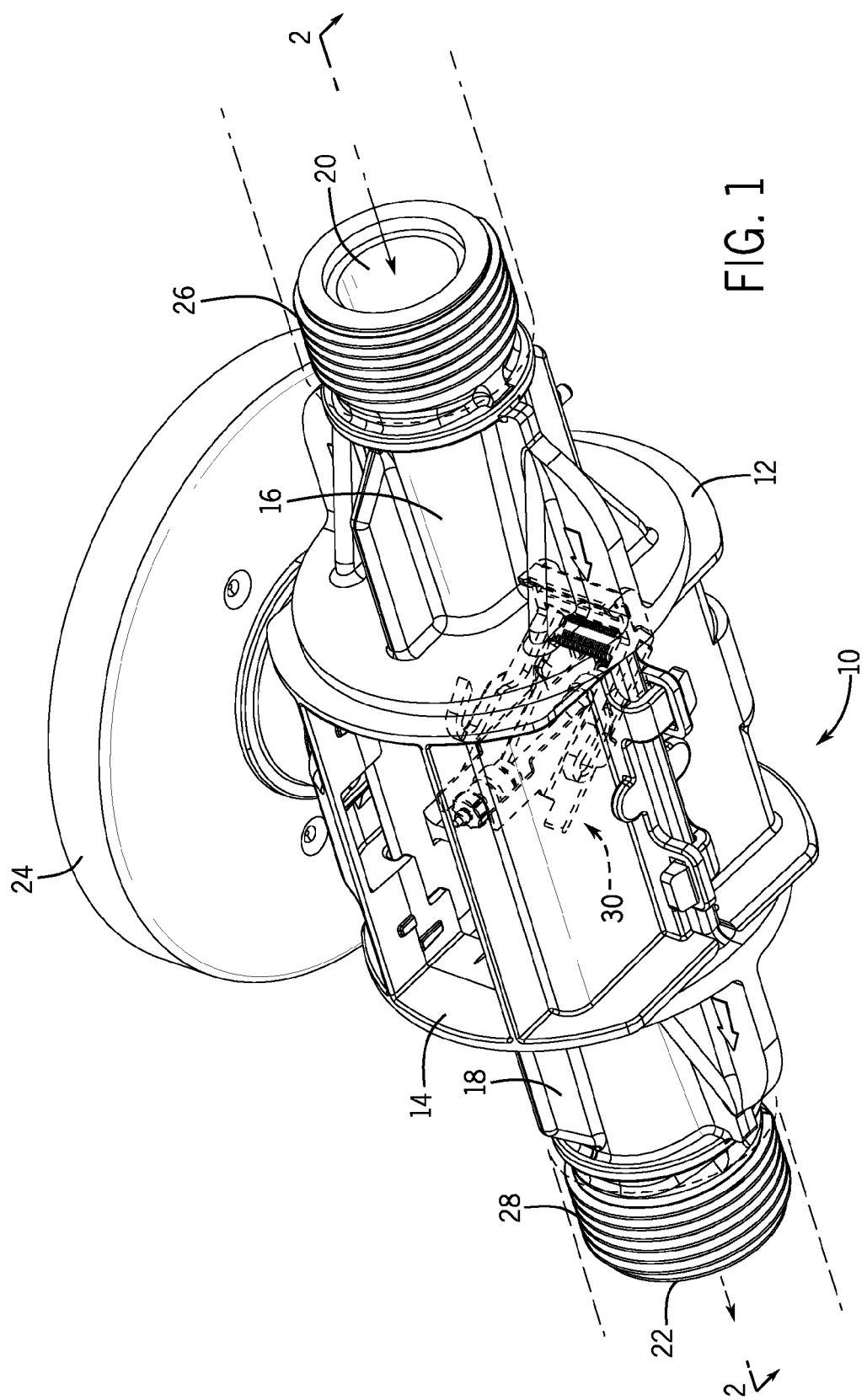
FIG. 1 is a perspective view of a flow tube and meter support that includes the magnetic flow transducer of the present disclosure.

FIG. 1 illustrates a magnetic induction flow meter 10 constructed in accordance with the present disclosure. The magnetic induction flow meter 10 includes a flow tube 12 that includes a central portion 14 positioned between an inlet end 16 and an outlet end 18. The inlet end 16 includes an inlet opening 20 that receives a flow of water while the outlet end 18 includes an outlet opening 22 that delivers a flow of water to downstream locations after the water has passed through the flow tube 12 and has been measured. In the embodiment shown in FIG. 1, the flow tube 12 includes a meter support 24 that is sized to receive and support an electronic water meter (not shown). As illustrated in FIG. 1, the inlet end 16 includes an inlet spud end 26 having external threads while the outlet end 18 includes a similar spud end 28 that includes a corresponding series of external threads. The spud ends 26, 28 allow the flow meter 10 to be placed within a water line to measure the water flow used by a residential building or commercial building.

As illustrated by the broken lines in FIG. 1, the flow meter 10 includes a magnetic flow transducer 30 that is used to electrically sense the flow of water through the flow tube 12 from the inlet opening 20 to the outlet opening 22. The detailed configuration and operation of the magnetic flow transducer 30 will be described in greater detail below.

Figure 2:
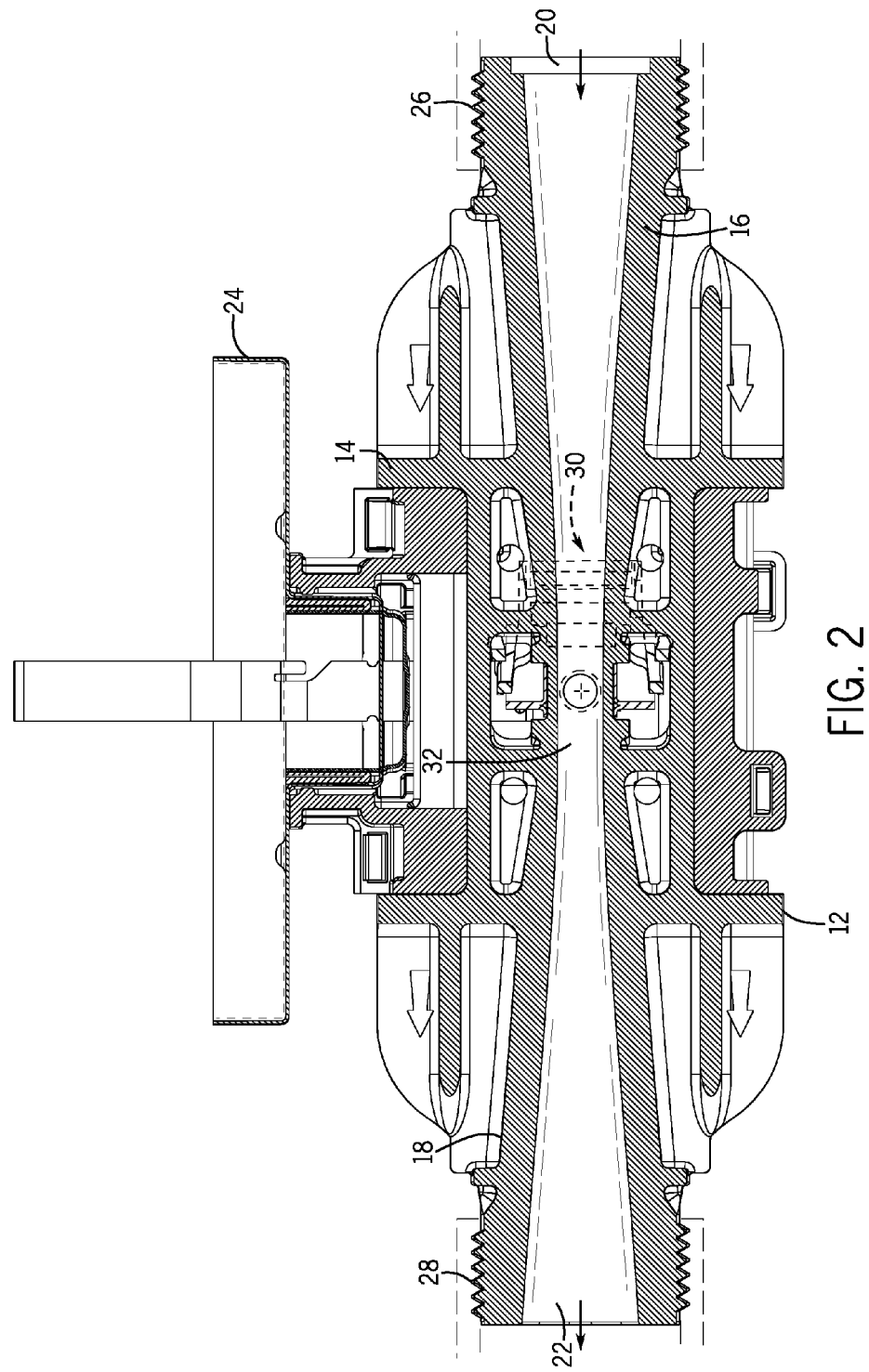
FIG. 2 is a section view taken along line 2-2 of FIG. 1.
Figure 10:
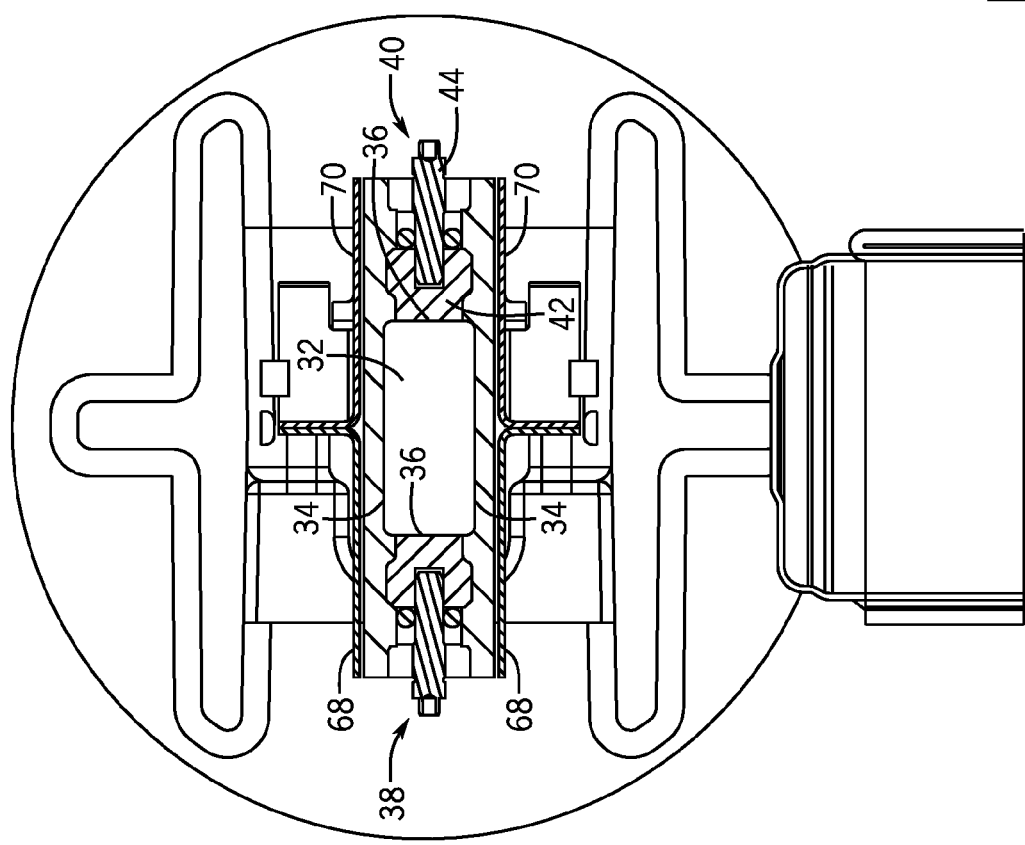
FIG. 10 is a section view showing the position of the electrodes and pole pieces with respect to the measuring channel extending through the flow tube of the magnetic inductive flow meter.

FIG. 2 provides a cross-section view of the flow tube 12, which includes the inlet end 16, the outlet end 18, and the central portion 14. As illustrated in FIG. 2, the inlet end 16 and outlet end 18 are integrally formed with the central portion 14. Preferably, the entire flow tube 12 is formed from a non-magnetic polymer that has a low surface charge characteristic to provide the least interference with the measurement signals within the flow tube. A central portion 14 of the flow tube defines a measuring channel 32 that has a known cross-sectional area that is used for determining the flow of liquid through the magnetic induction flow meter. As can be seen in FIG. 10, the measuring channel 32 has a generally rectangular cross-section defined by a pair of spaced sidewalls 34 and a pair of spaced end walls 36. The flow of water through the flow meter 10 transitions from the round inlet opening 20 to the rectangular measuring channel 32 and again transitions back to the round outlet end 22. The measuring channel 32 could have other shapes such as a square or an inversely proportioned rectangular cross-section.

Figure 3:
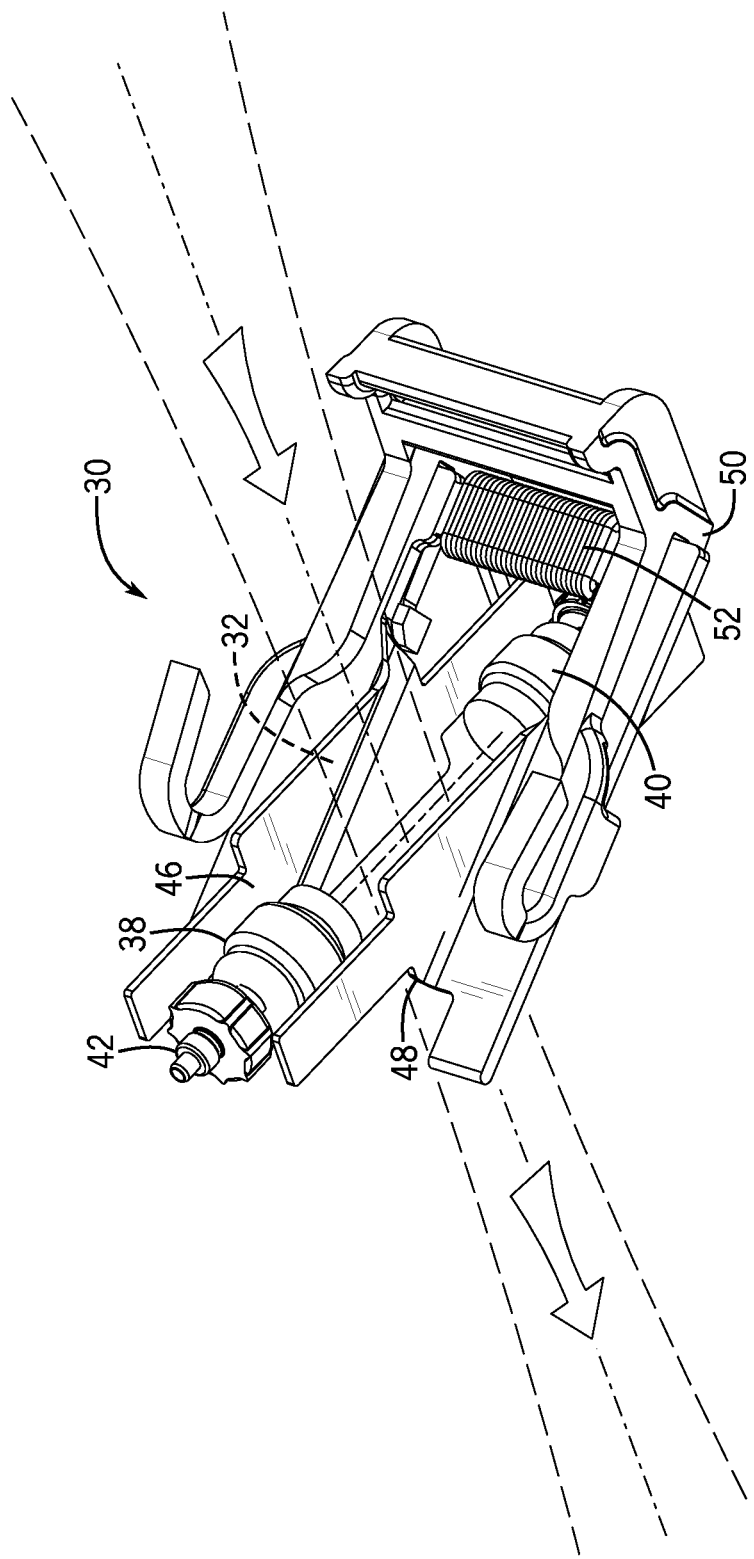
FIG. 3 is a magnified view of the flow transducer including the magnetic pole pieces constructed in accordance with the present disclosure.
Figure 6:
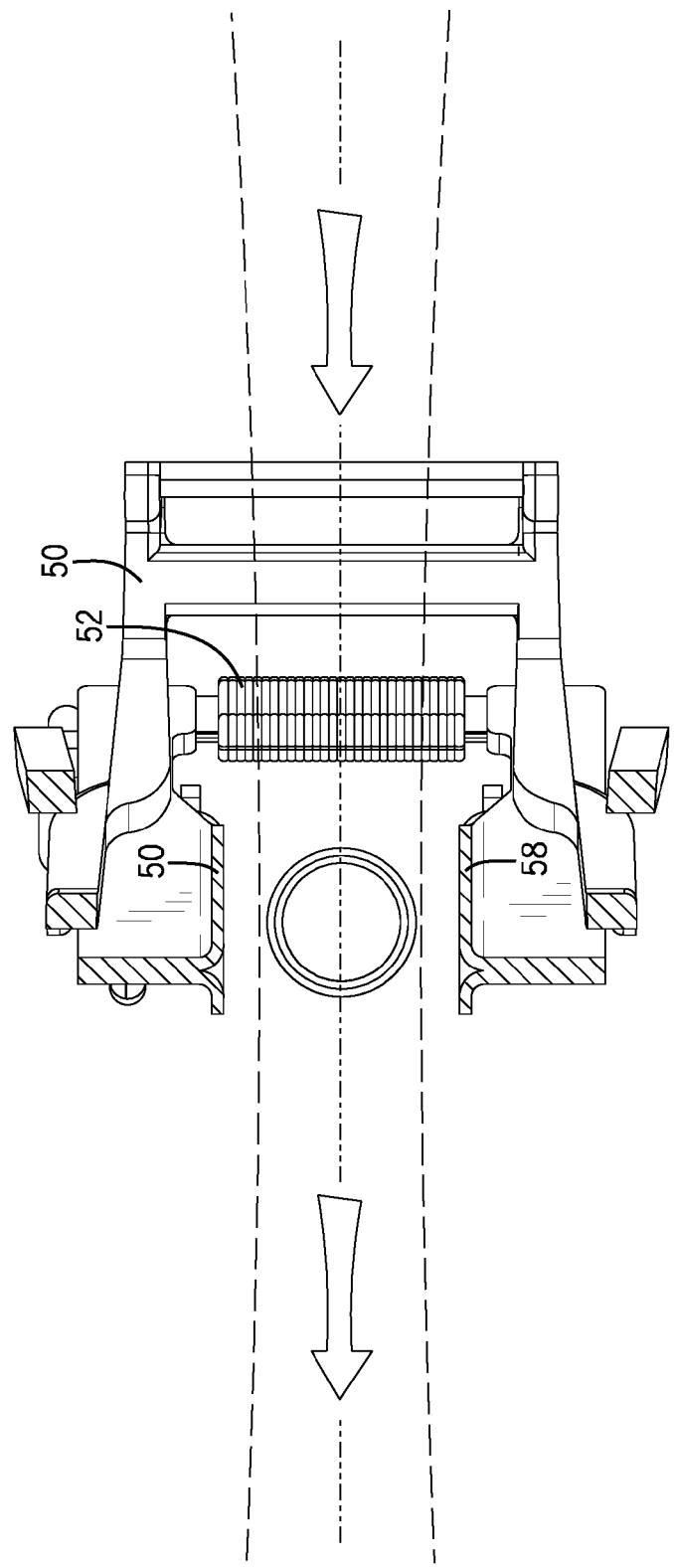
FIG. 6 is a top, section view taken along line 6-6 of FIG. 4.

Referring now to FIG. 3, the magnetic induction flow meter includes a magnetic flow transducer 30 which is shown in FIG. 3 apart from the flow meter. The magnetic flow transducer 30 is positioned within the flow tube 12 shown in FIG. 2 such that the flow transducer 30 generates an electric sensing signal that is related to the flow rate of fluid through the measuring channel 32.

As illustrated in FIG. 3, the magnetic flow transducer 30 includes a first electrode 38 and a second electrode 40. As shown in FIG. 10, both the first electrode 38 and the second electrode 40 include a graphite plug 42 that holds a silver pin 44. The graphite plug 42 and the silver pin 44 are both diamagnetic materials. The first electrode 38 is positioned adjacent one of the end walls 36 while the second electrode 40 is positioned adjacent the opposite end wall 36. The electrodes 38, 40 are thus spaced from each other by the measuring channel.

Referring back to FIG. 3, the magnetic flow transducer 30 further includes a first magnetic pole piece 46 and a second magnetic pole piece 48. The magnetic pole pieces 46, 48 are each received within a retainer 50 that holds the pole pieces in the orientation shown. Each of the magnetic pole pieces 46, 48 are in electrical contact with the coils of an electromagnet 52. The electromagnet 52 in turn is connected to a drive circuit such that the electromagnet 52 creates an alternating magnetic field between the first and second pole pieces 46, 48 and thus across the measuring channel. The retainer 50 is formed from a non-magnetic material, such as plastic, such that the retainer 50 does not affect the magnetic field created by the pole pieces 46, 48. The retainer 50 properly orients the magnetic pole pieces 46, 48 such that the entire magnetic flow transducer 30 can be properly installed within the flow tube of the magnetic induction flow meter.

Figure 9:
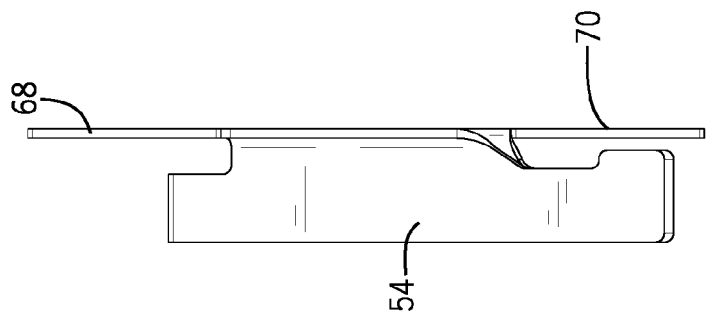
FIG. 9 is an end view of the magnetic pole piece.
Figure 8:
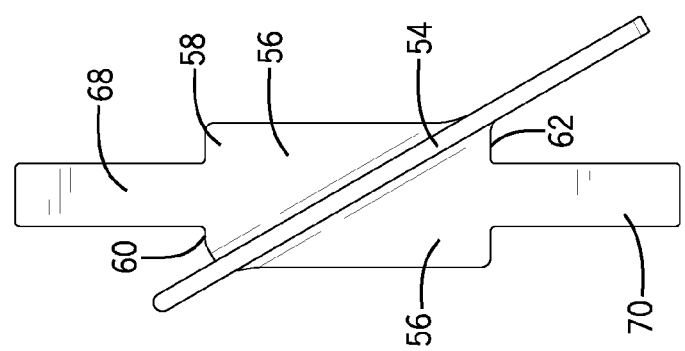
FIG. 8 is a front view of the magnetic pole piece.
Figure 7:
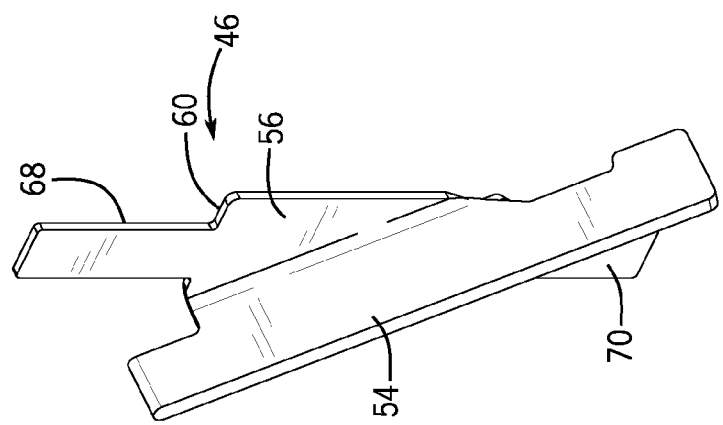
FIG. 7 is a front perspective view of the magnetic pole piece.

FIGS. 7-9 illustrate the physical configuration of each of the magnetic pole pieces 46, 48. Although only the first magnetic pole piece 46 is shown in FIGS. 7-9, it should be understood that the second magnetic pole piece 48 is identical in configuration.

The magnetic pole piece 46 is formed from a single sheet of stamped electrical sheet steel that is folded over upon itself along the attachment strip 54. Each half of the attachment strip 54 includes a triangular portion 56 that are coplanar with each other. The pair of triangular portions 56 combines to form a generally rectangular surface element 58. The rectangular surface element 58, formed from the combined planar triangular portions 56, includes a first end 60 and a second end 62.

As can be seen in FIGS. 4 and 5, the first end 60 is generally aligned with a face surface 64 of the first electrode 38 while the second end 62 is generally aligned with the face surface 66 of the second electrode 40. As shown in FIG. 5, the face surfaces 64, 66 are generally in contact with the end wall 36 of the measuring channel 32. As also illustrated in FIG. 5, the rectangular surface element 58 is positioned in physical contact with one of the sidewalls 34 of the measuring channel 32.

Referring back to FIGS. 7-9, the magnetic pole piece 46 constructed in accordance with the present disclosure includes extended tabs that increase the physical size of the magnetic pole pieces 46. Specifically, each of the magnetic pole pieces includes a first tab 68 that extends above the first end 60 and a second tab 70 that extends from the second end 62. Each of the first and second tabs 68, 70 are integrally formed with the remaining portions of the magnetic pole piece. The first and second tabs 68, 70 each have a generally rectangular shape.

Referring now to FIG. 4, when the entire magnetic flow transducer 30 is assembled, the first tabs 68 on each of the first and second magnetic pole pieces 46, 48 are positioned on opposite sides of the first electrode 38 and overlap the diamagnetic materials that form the first electrode 38, which include the silver pin and graphite plug. Likewise, the second tab portions 70 on each of the first and second magnetic pole pieces 46, 48 are positioned on opposite sides of the second electrode 40 and overlap the diamagnetic materials that form the second electrode 40. The first and second tab portions 68, 70 each extend past the face surfaces 64, 66 of the first and second electrodes 38, 40 and overlap substantially all of the first and second electrodes 38, 40 as clearly shown in FIGS. 4 and 5.

Although a specific shape and construction of the magnetic pole pieces 46 and 48 is shown and described, it is contemplated that other constructions could fall within the scope of the present disclosure. As an example, it is contemplated that the single sheet of the stamped electrical sheet steel could be reconfigured and not folded over upon itself. Further, the attachment strip could be eliminated. However, each of the magnetic pole pieces 46 and 48 would include the first and second tabs 68, 70 that are designed to overlap the diamagnetic materials that for the electrodes.

During use of magnetic pole piece, such as shown in U.S. Pat. No. 8,826,743, it was found that increasing the magnetic field strength across the magnetic pole pieces to improve measurement accuracy, especially at low flow rates, did not increase the reliability of the measurements. As described above, the sensing electrodes positioned across the measuring channel include a graphite plug and a silver pin which, along with the water flowing through the measuring channel, are diamagnetic materials. After studying the silver, graphite and water diamagnetic materials, it was determined that the magnetic field created by the magnetic pole pieces in prior art designs created a fringe field, which in turn created a voltage in the diamagnetic materials of the electrode plug. This voltage was increased when the magnetic field was increased. The magnetic field was increased to improve measurements at low flow rates.

To address this problem, the first and second magnetic pole pieces 46, 48 of the present disclosure were designed to include the first and second tabs 68, 70. The first and second tabs 68, 70 are generally aligned with and adjacent to each of the pair of spaced first and second electrodes 38, 40. The extended first and second tabs 68, 70 are sized and positioned to overlap the diamagnetic materials that form the electrodes 38, 40. As the magnetic field strength increases, the extended portions of the magnetic pole pieces created by the first and second tabs 68, 70 create a more symmetric magnetic field, thereby reducing the fringe effect of the magnetic field on the diamagnetic materials that form the electrodes and increases the accuracy of the meter, especially at low flow rates. Thus, the inclusion of the first and second tabs, which are generally aligned with and overlap the diamagnetic materials of the first and second electrodes 38, 40, increases the accuracy of the magnetic induction flow meter while only slightly increasing the cost of manufacture of the magnetic pole pieces.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. A magnetic inductive flow meter, comprising:
   a flow tube having an inlet, an outlet and a measuring channel positioned between the inlet and the outlet;
   a first electrode and a second electrode positioned on opposite sides of the measuring channel;
   a pair of magnetic pole pieces positioned on opposite sides of the measuring channel and orthogonal to the first and second electrodes, wherein a portion of each of the magnetic pole pieces is positioned to overlap each of the first and second electrodes; and
   an electromagnet coupled to the pair of magnetic pole pieces and configured to generate an alternating magnetic field across the measuring channel.

2. The magnetic inductive flow meter of claim 1 wherein:
   each of the first and second magnetic pole pieces includes a generally rectangular surface element having a first end and a second end;
   a first tab portion extending from the first end of the surface element of each of the first and second magnetic pole pieces and positioned to overlap the first electrode; and
   a second tab portion extending from the second end of the surface element of each of the first and second magnetic pole pieces and positioned to overlap the second electrode.

3. The magnetic inductive flow meter of claim 2 wherein the first and second tab portions are integrally formed with the surface element.

4. The magnetic inductive flow meter of claim 2 wherein the first and second tab portions extend in opposite directions from the surface element.

5. The magnetic inductive flow meter of claim 2 wherein each of the first and second magnetic pole pieces includes an attachment strip that extends diagonal to the rectangular surface element.

6. The magnetic inductive flow meter of claim 1 wherein the measuring channel has a rectangular cross-section having a pair of spaced sidewalls and a pair of spaced end walls, wherein each of the first and second electrodes is positioned adjacent to one of the end walls and the portion of each of the first and second magnetic pole pieces positioned to overlap each of the electrodes extends past one of the end walls.

7. The magnetic inductive flow meter of claim 5 wherein the attachment strip is coupled to the electromagnet.

8. The magnetic inductive flow meter of claim 2 wherein the first tab portion and the second tab portion are generally rectangular.

9. The magnetic inductive flow meter of claim 2 wherein the first and second electrodes each include a plug and a pin formed from diamagnetic materials, wherein the first and second tabs overlap the diamagnetic materials.

10. A magnetic flow transducer for use in a magnetic inductive flow meter having a flow tube including a measuring channel, the magnetic flow transducer comprising:
    a first electrode and a second electrode positioned on opposite sides of the measuring channel;
    a first magnetic pole piece and a second magnetic pole piece positioned on opposite sides of the measuring channel and orthogonal to the first and second electrodes, wherein a portion of the first and second magnetic pole pieces are positioned to overlap each of the first and second electrodes when the magnetic flow transducer is positioned within the flow meter; and
    an electromagnet coupled to the first and second magnetic pole pieces and configured to generate an alternating magnetic field through the measuring channel.

11. The magnetic inductive flow meter of claim 10 wherein:
    each of the first and second magnetic pole pieces includes a generally rectangular surface element having a first end and a second end;
    a first tab portion extending from the first end of the surface element of each of the first and second magnetic pole pieces and positioned to overlap the first electrode; and
    a second tab portion extending from the second end of the surface element of each of the first and second magnetic pole pieces and positioned overlap the second electrode.

12. The magnetic inductive flow meter of claim 11 wherein the first and second tab portions are integrally formed with the surface element.

13. The magnetic inductive flow meter of claim 11 wherein the first and second tab portions extend in opposite directions from the surface element.

14. The magnetic inductive flow meter of claim 11 wherein each of the first and second magnetic pole pieces includes an attachment strip that extends diagonal to the rectangular surface element.

15. The magnetic inductive flow transducer of claim 10 wherein the measuring channel has a rectangular cross-section having a pair of spaced sidewalls and a pair of spaced end walls, wherein each of the first and second electrodes is positioned adjacent to one of the end walls and the portion of the first and second magnetic pole pieces that overlap each of the electrodes extends past one of the end walls.

16. The magnetic inductive flow transducer of claim 10 wherein the first tab portion and the second tab portion are generally rectangular.

17. The magnetic inductive flow transducer of claim 10 wherein the first and second electrodes each include a plug and a pin formed from diamagnetic materials, wherein the first and second tabs overlap the diamagnetic materials.

18. A magnetic inductive flow meter, comprising:
    a flow tube having an inlet, an outlet and a measuring channel having a rectangular cross-section including a pair of spaced end walls and a pair of spaced sidewalls, wherein the measuring channel is positioned between the inlet and the outlet;
    a first electrode and a second electrode positioned adjacent to opposite end walls of the measuring channel;
    a first magnetic pole piece and a second magnetic pole piece each positioned adjacent to opposite sidewalls of the measuring channels and orthogonal to the first and second electrodes, wherein each of the first and second magnetic pole pieces includes a generally rectangular surface element having a first end and a second end;
    a first tab portion extending from the first end of the surface element of each of the first and second magnetic pole pieces, wherein the first tab portion extends past one of the end walls and is positioned to overlap the first electrode;
    a second tab portion extending from the second end of the surface element of each of the first and second magnetic pole pieces, wherein the second tab portion extends past one of the end walls and is positioned to overlap the second electrode; and an electromagnet coupled to the first and second magnetic pole pieces and configured to generate an alternating magnetic field across the measuring channel.

19. The magnetic inductive flow meter of claim 18 wherein the first and second tab portions are integrally formed with the surface element.

20. The magnetic inductive flow meter of claim 19 wherein the first and second electrodes each include a plug and a pin formed from diamagnetic materials, wherein the first and second tabs overlap the diamagnetic materials.

\* \* \* \* \*